United States Patent
Klindt et al.

(10) Patent No.: US 7,146,370 B1
(45) Date of Patent: *Dec. 5, 2006

(54) COPYING A PORTION OF A DATABASE STRUCTURE ASSOCIATED WITH A QUERY

(75) Inventors: Jerry L. Klindt, Hawaiian Gardens, CA (US); Paul L. Sinclair, Manhattan Beach, CA (US)

(73) Assignee: NCR Corp., Dayton, OH (US)

( * ) Notice: Subject to any disclaimer, the term of this patent is extended or adjusted under 35 U.S.C. 154(b) by 663 days.

This patent is subject to a terminal disclaimer.

(21) Appl. No.: 09/892,837

(22) Filed: Jun. 27, 2001

(51) Int. Cl.
*G06F 17/30* (2006.01)

(52) U.S. Cl. .................. 707/100; 707/103 R; 707/102; 707/3; 707/2

(58) Field of Classification Search ................ 707/102, 707/100, 103, 10, 1, 103 R, 2–4
See application file for complete search history.

(56) References Cited

U.S. PATENT DOCUMENTS

| | | | | |
|---|---|---|---|---|
| 5,295,256 A | * | 3/1994 | Bapat | 707/103 |
| 5,920,725 A | * | 7/1999 | Ma et al. | 707/103 |
| 6,105,036 A | * | 8/2000 | Henckel | 707/104 |
| 6,182,281 B1 | * | 1/2001 | Nackman et al. | 717/5 |
| 6,279,008 B1 | * | 8/2001 | Tung et al. | 707/102 |
| 6,519,642 B1 | * | 2/2003 | Olsen et al. | 709/227 |

* cited by examiner

*Primary Examiner*—Cam-Y Truong
(74) *Attorney, Agent, or Firm*—Baker Botts, LLP

(57) ABSTRACT

A method and computer system for copying a portion of a database structure associated with a query are disclosed. The database includes one or more database objects. The method includes recursively retrieving object definitions for one or more database objects associated with a query to produce an ordered set of object definitions. It also includes building a copy of the database structure using the ordered set of object definitions.

27 Claims, 6 Drawing Sheets

COPYING A PORTION OF A DATABASE STRUCTURE ASSOCIATED WITH A QUERY

BACKGROUND

Database system providers commonly offer technical support to their customers. As part of this support, the providers assist customers in troubleshooting problems that arise in customer databases, for example, when a SQL query fails. SQL is the dominant language for managing information in relational databases.

Troubleshooting a failed query can be difficult, since it is often necessary to attempt to reproduce the problem, possibly in the system provider's laboratory. This may require the system provider to retrieve from the customer the definitions of any objects associated with the query, including definitions of objects that are in turn referenced by these definitions. It also may require capturing configuration information regarding the computer system and a statistical view of data in the database.

To obtain the definitions, the technical support provider typically identifies each database object associated with the query, for example as a table or a view. The provider then executes an appropriate SQL command for the object, which returns the object definition. For example, in the Teradata Active Data Warehousing System, available from NCR Corporation, a SHOW TABLE command returns the definition of a table in the form of the data definition language (DDL) necessary to create the table. Similarly, the SHOW VIEW, SHOW MACRO, SHOW TRIGGER, and SHOW JOIN INDEX commands return the definitions of those database objects. The database object definitions are stored in a data dictionary (DD). The provider then identifies each object referenced within the retrieved definition, obtains definitions for those objects, and repeats the process. This continues until the provider believes that all of the necessary object definitions have been obtained. For some database objects, such as triggers and join indexes, the association of the database object with the query may only become apparent upon examination of the data dictionary.

The definitions may then be transferred to a computer in the system provider's laboratory. Possible difficulties arise when insufficient object definitions are obtained, either by the provider or by the customer, either of whom may have insufficiently stated or understood the problem. The provider may discover that definitions were not obtained for objects referenced in the definition of another object, in which case additional information must be obtained from the customer's database system. In a situation such as this, it may take multiple contacts with the customer over a period of several days to obtain the necessary information. Such multiple contacts may produce customer dissatisfaction with the service provided. Furthermore, the customer may alter one or more object definitions between the time the customer identifies the problem and the time the definitions are gathered. If the customer's alterations eliminate the problem, the service provider may spend a great deal of time trying to solve a problem that no longer exists using the gathered definitions.

SUMMARY

In general, in one aspect, the invention features a method for copying a portion of a database structure, the database including one or more database objects. The method includes recursively retrieving object definitions for one or more database objects associated with a query to produce an ordered set of object definitions. The method further includes building a copy of the database structure using the ordered set of object definitions.

Implementations of the invention may include one or more of the following. Recursively retrieving object definitions may include recursively identifying objects associated with the query, X categorizing each identified object into a category, and retrieving an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the be identified object is categorized as a join index, a SHOW TRIGGER statement if the identified object is categorized as a trigger, or a SHOW MACRO statement if the identified object is categorized as a macro.

Recursively retrieving object definitions may include retrieving unretrieved object definitions for a set of objects known to be associated with the query, adding to the set of objects known to be associated with the query those objects contained in the retrieved object definitions that are not already in the set of objects known to be associated with the query, and repeating these two items until no new objects are added to the set of objects known to be associated with the query.

The method may include sending the ordered set of object definitions from a first computer to a second computer. The order of the ordered set of object definitions may also be changed. Changing the order may include reordering the object definitions so that each object definition is ordered before the definition of any object that references it. The object definitions may be ordered so that each object definition is ordered before the definition of any object that references it.

Recursively retrieving object definitions for one or more database objects may include looking for references to the one or more database objects in a data dictionary.

In general, in another aspect, the invention features a computer-readable medium containing computer-executable code for instructing a computer to recursively retrieve object definitions for one or more database objects associated with a query to produce an ordered set of object definitions. The computer-executable code includes computer-executable code for instructing a computer to build a copy of the database structure using the ordered set of object definitions.

Implementations of the invention may include one or more of the following. The computer-executable code, when recursively retrieving object definitions, may instruct the computer to recursively identify objects associated with the query and categorize each identified object into a category. The computer-executable code may then retrieve an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the identified object is categorized as a join index, a SHOW TRIGGER statement if the identified object is categorized as a trigger, or a SHOW MACRO statement if the identified object is categorized as a macro.

The computer-executable code may instruct the computer, when recursively retrieving object definitions, to retrieve unretrieved object definitions for a set of objects known to be associated with the query, and may add to the set of objects known to be associated with the query those objects contained in the retrieved object definitions that are not already in the set of objects known to be associated with the query. The code may repeat these instructions until no new objects are added to the set of objects known to be associated with the query.

The computer-executable code may instruct the computer to send the object definitions from a first computer to a second computer. The code may instruct the computer to change the order of the ordered set of object definitions. The computer may be instructed to reorder the object definitions so that each object definition is ordered before the definition of any object that references it. The computer may be instructed to store the definitions so that each object definition is ordered before the definition of any object that references it.

The computer-executable code may instruct the computer, when recursively retrieving object definitions for one or more database objects, to look for references to the one or more database objects in a data dictionary.

In general, in another aspect, the invention features a package of data useful in building a copy of a database structure. The package is generated in accordance with the act of recursively retrieving object definitions for one or more database objects associated with a query to produce an ordered set of object definitions.

Implementations of the invention may include one or more of the following. The object definitions may be recursively retrieved in accordance with the acts of recursively identifying objects associated with the query, categorizing each identified object into a category, retrieving an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the identified object is categorized as a join index, a SHOW TRIGGER statement if the identified object is categorized as a trigger, or a SHOW MACRO statement if the identified object is categorized as a macro.

The object definitions may be recursively retrieved in accordance with the acts of retrieving unretrieved object definitions for a set of objects known to be associated with the query, adding to the set of objects known to be associated with the query those objects contained in the retrieved object definitions that are not already in the set of objects known to be associated with the query, and repeating until no new objects are added to the set of objects known to be associated with the query.

The implementation may include the act of sending the ordered set of object definitions from a first computer to a second computer, as well as the act of instructing the computer to change the order of the ordered set of object definitions. The act of changing the order of the ordered set of object definitions may include reordering the object definitions so that each object is ordered before the definition of any object that references it.

The act of storing object definitions may include storing the object definitions so that each object definition is ordered before the definition of any object that references it.

The act of recursively retrieving object definitions for one or more database objects may include looking for references to the one or more database objects in a data dictionary.

Other features and advantages will become apparent from the description and claims that follow.

DETAILED DESCRIPTION

Figure 1:
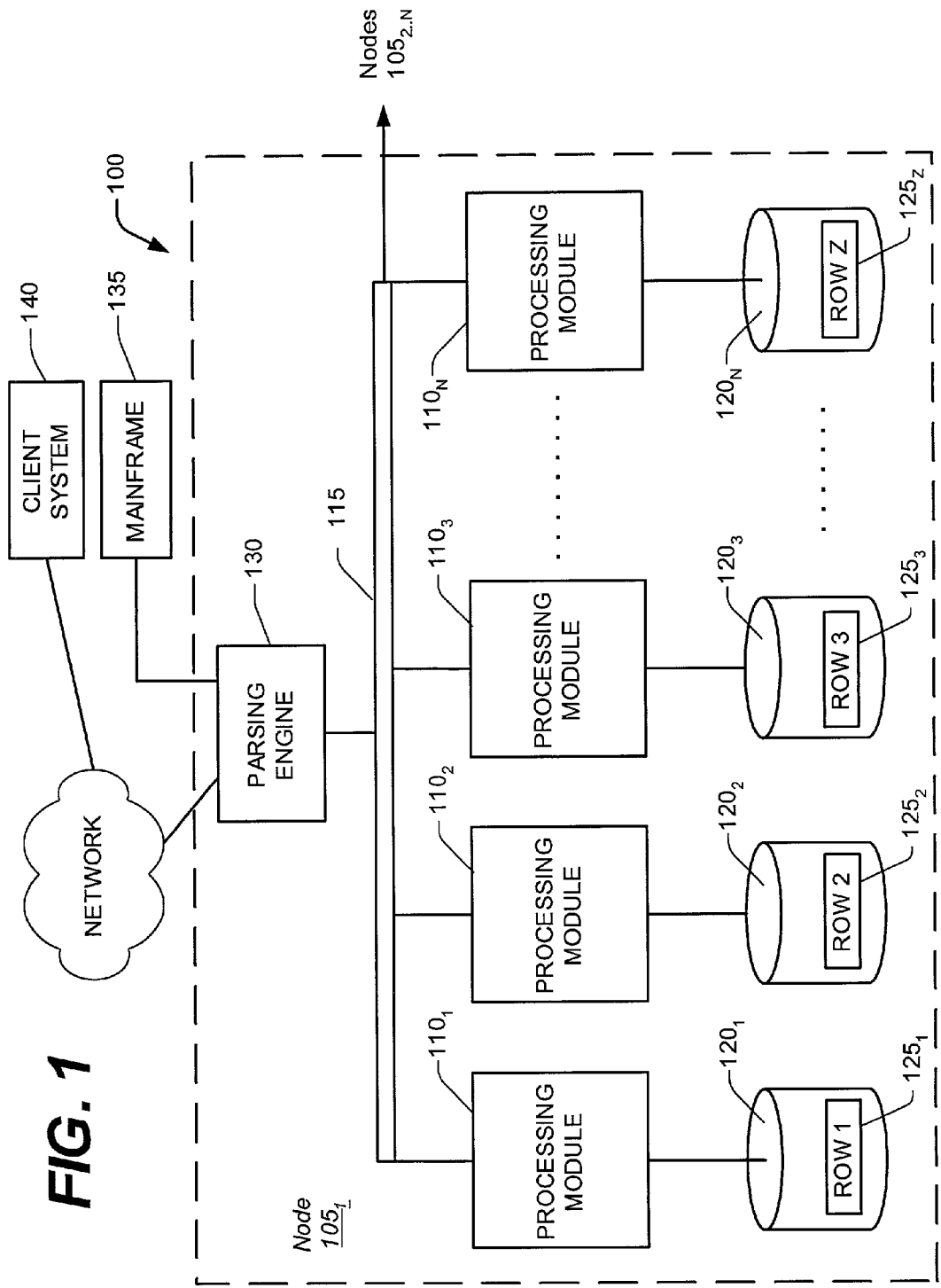
FIG. 1 is a block diagram of a node of a database system.

The database object retrieval technique disclosed herein has particular application to large databases which might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $101_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries in a standard format, such as SQL.

Figure 2:
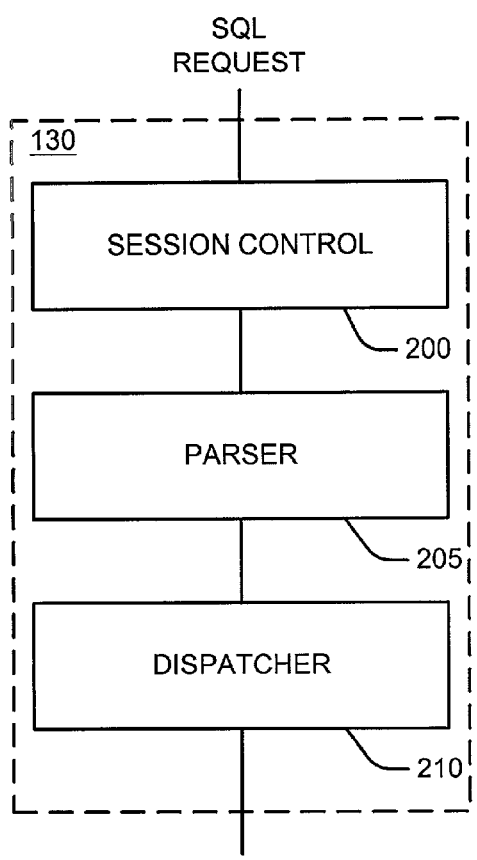
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
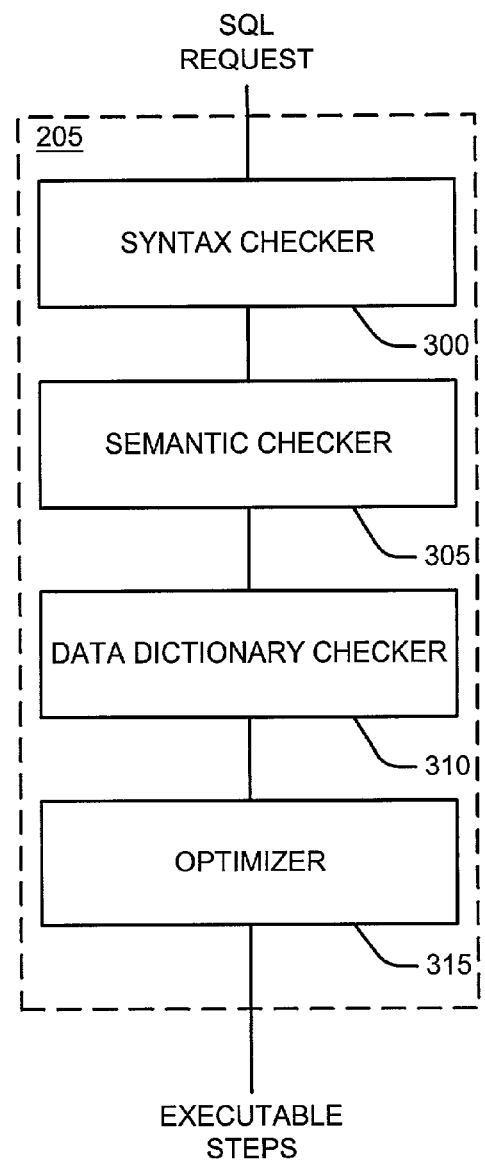
FIG. 3 is a flow chart of a parser.

Once the session control 200 allows a session to begin, a user may submit a SQL request, which is routed to the parser 205. As illustrated in FIG. 3, the SQL request is checked for proper SQL syntax (block 300), evaluated semantically (block 305), and checked in the data dictionary to ensure that all of the objects specified in the SQL request actually exist and that the user has the authority to perform the request (block 310). Finally, the parser 205 runs an optimizer (block 315), which develops the least expensive plan to perform the request.

Figure 4:
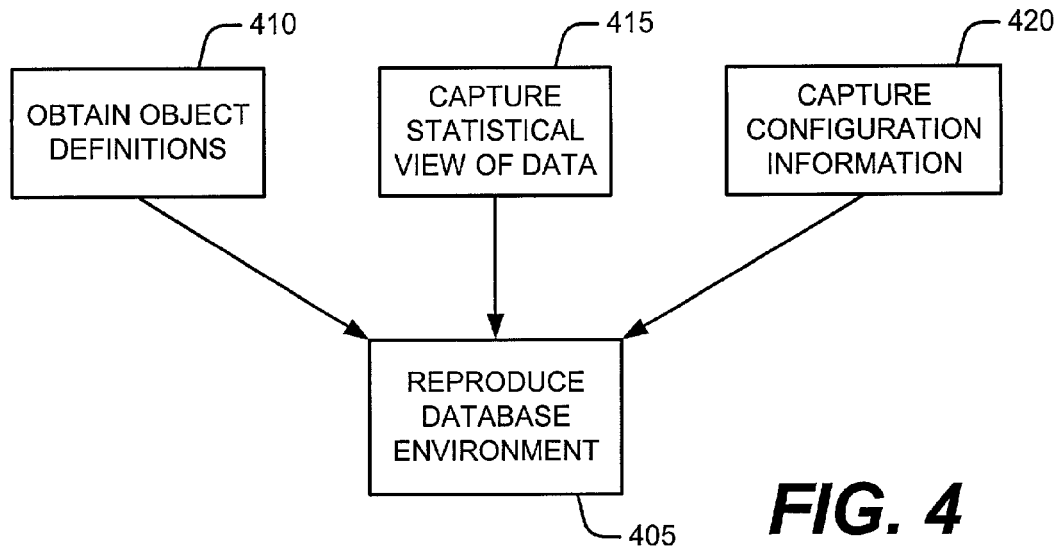
FIG. 4 is a block diagram of a method for reproducing a database environment.

As depicted in FIG. 4, the process of reproducing a database environment (block 405) may include several steps: obtaining object definitions of data in a database (block 410); capturing a statistical view of data in the database (block 415); and capturing configuration information concerning the database (block 420). The system described herein automates the step of obtaining object definitions (block 410). The other processes (blocks 415 and 420) are outside the scope of this disclosure. The system provides in one automated procedure a complete list of object definitions. By performing this function, the system can help reduce the time between identification of a problem by a customer and obtaining the object definitions necessary to troubleshoot the problem.

Figure 5:
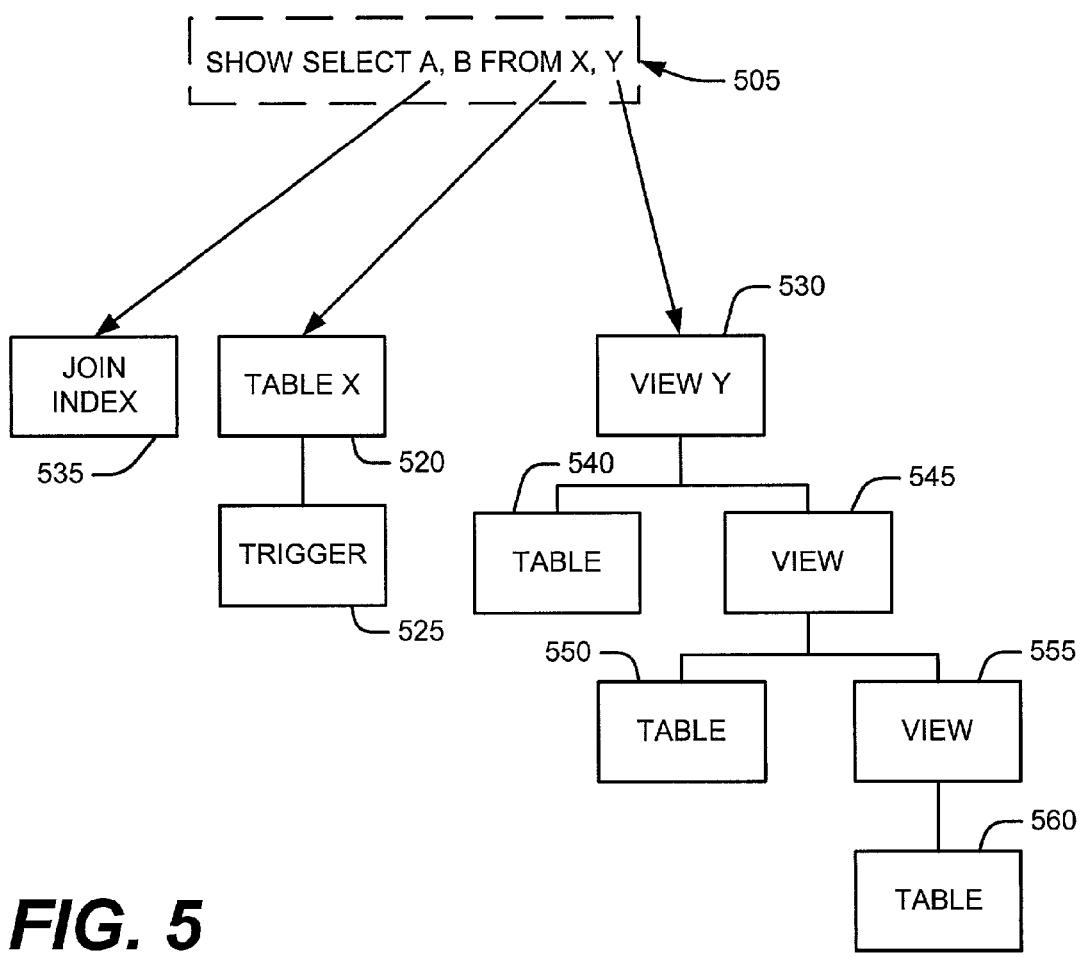
FIG. 5 is a block diagram of an example of the structure of a query and the database elements it references.

The automated process of obtaining database object definitions typically begins with a SQL command 505, e.g., SHOW SELECT A, B FROM X, Y, as shown in FIG. 5. The command 505 may contain the failed query, in this case "SELECT A, B FROM X, Y." This type of query is often called a Data Manipulation Language (DML) statement, and command 505 may be called a "SHOW DML statement." Although command 505 is available to all users of the system, for security reasons the user issuing the SHOW DML statement must have permission to access the database objects associated with the query, which may be any object in the database. An object is "associated" with a query if the object appears in the query itself or appears in the definition of an associated object or is somehow associated with the query through the data dictionary. FIG. 5 displays the database objects that are associated with this example query. Table X object 520 is associated with the query because it explicitly appears in the query. Trigger 525 is associated with the query because it appears in the data dictionary as code to be implemented when defined changes occur to data contained in Table X 520, as signified by the line connecting the two boxes. View Y 530 is associated with the query because it is explicitly included in the query 505. The association of a join index 535 is revealed upon examination of the data dictionary. A table 540 and a view 545 are associated with the query because they are included in the definition of View Y 530. Similarly, a table 550 and a view 555 are associated with the query because they are included in the definition of the view 545, and table 560 is associated with the query because it is included in the definition of the view 555.

In existing technical support environments, the technical support staff will execute successive SHOW statements and queries into the data dictionary to find the definitions of objects associated with the query. The system disclosed herein automates this process by recursively retrieving object definitions for objects known to be associated with a query, and adding to a set of objects known to be associated with the query any new objects identified in the retrieved definitions.

Figure 6:
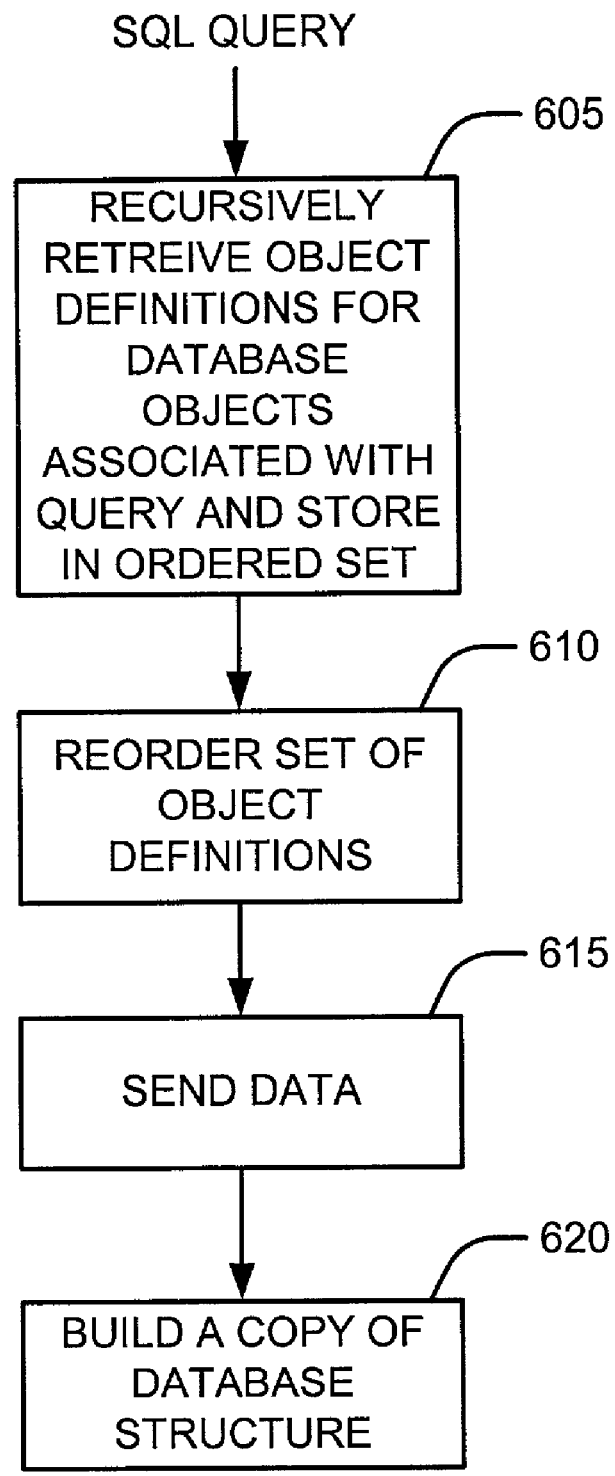
FIG. 6 is a flow chart of a method for displaying underlying database objects.

The automated system recursively retrieves object definitions for database objects associated with the SQL query, as shown in FIG. 6, and stores the object definitions in an ordered set, for example in a file (block 605).

Frequently, the order of the object definitions within the file will not be convenient, in the sense that the file could not be used to recreate the database in a single submission to the database creation process. In one example system, the object definitions are reordered within the file (block 610) so that, if this file were submitted to the database creation process, the definition of each database object would output before the definitions of any objects that reference it. This is an optional step, because the effect of reordering the object definitions within the file could be accomplished by repeatedly submitting the file to the database creation process (block 620) until no error messages are returned. Each successive submission would create that portion of the database that it was possible to create given the database structure already in place. The submissions would continue until the structure is complete. Alternatively, the object definitions could be manually reordered within the file. In still another alternative, an automated process could be applied to reorder the object definitions within the file.

In most cases, the file containing the ordered (or reordered, if block 610 is applied) set of object definitions is sent to another computer (block 615) using a computer utility such as email or FTP. This may happen automatically or as the result of human intervention. In one example, the definitions may be obtained on a customer's computer and then transmitted to a system provider's computer. Alternatively, the set of object definitions may be displayed on a screen or saved to a file. In some cases, the file is not sent to another computer and the database is rebuilt on the same computer.

Finally, the object definitions are used to create a copy of the database structure (block 620) by submitting the file to a database creation process.

Figure 7:
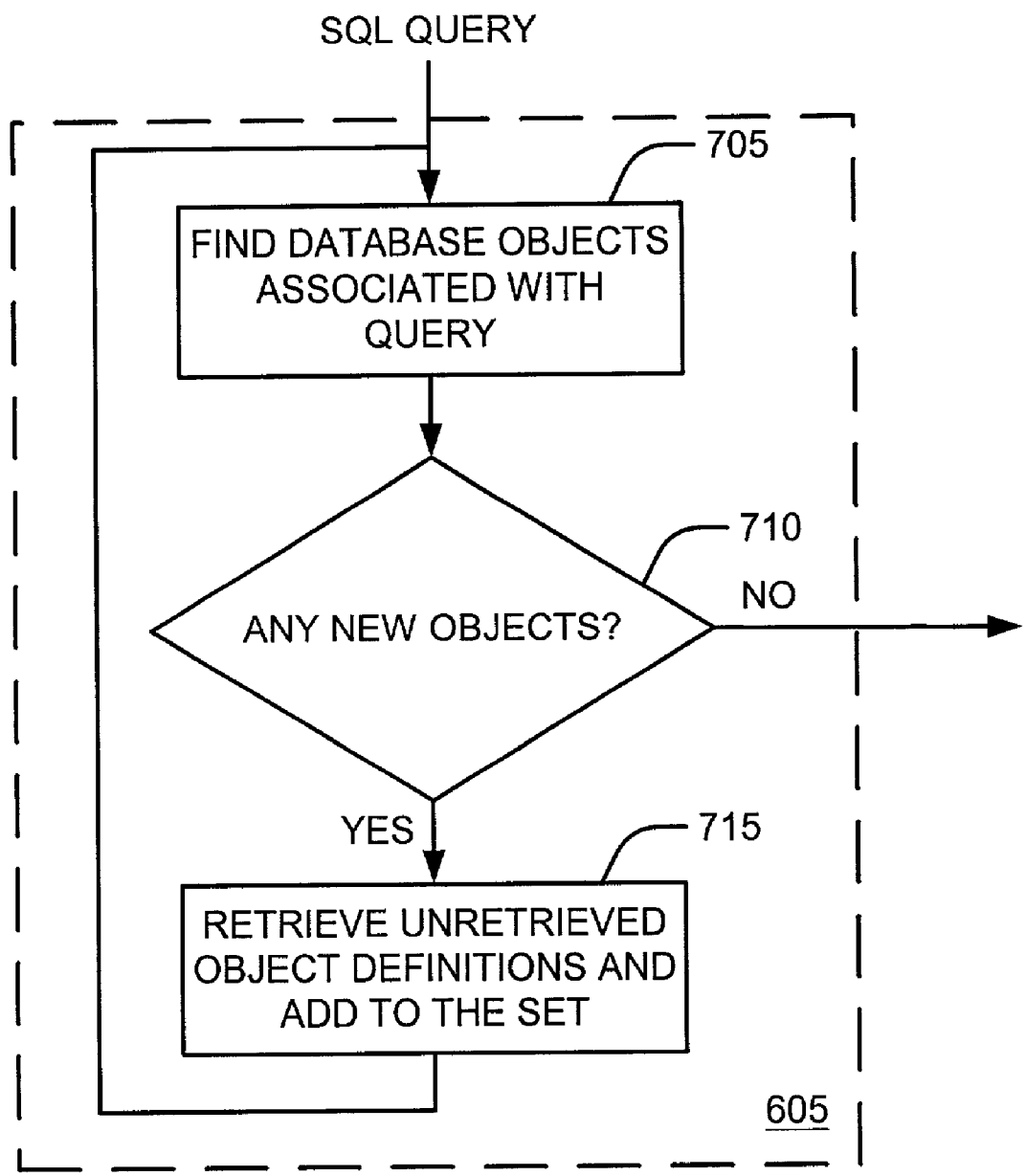
FIG. 7 is a flow chart of a method for finding and obtaining definitions for database objects associated with a query.

The process of recursively retrieving object definitions for database objects associated with a query, illustrated in more detail in FIG. 7, includes identifying database objects associated with the query (block 705). If any new objects were identified (block 710), object definitions for the new objects are retrieved and added to the set of object definitions associated with the query (block 715). A number of methods for recording which database objects are new are possible. For example, the system may maintain a set of objects known to be associated with the query. The set may be in a file where the database objects are stored as they are discovered. When the system encounters a database object it checks the file. If the database object is not in the file, the system will add the database object to the file of database objects. Furthermore, the ordered set of database object definitions may be a file with the object definitions stored sequentially as they are discovered, in which case the set of objects associated with the query may be the database objects listed in the file of object definitions. Other ways of recording the database object definitions will be apparent without further discussions.

For the first pass through the iterative process illustrated in FIG. 7, the system will find the database objects explicitly identified in the query or that are tied to those database objects through the data dictionary. For example, in the query 505 illustrated in FIG. 5, the process will find Table X 520 and View Y 530 in the first pass. Since these are new objects (block 710), the system will retrieve their object definitions and start the ordered set of object definitions associated with the query. The system would examine the data dictionary and find that a join index 535 has been created that might be useful in executing the query because it covers all or a portion of Table X 520 or View Y 530. Consequently, the join index would be identified as a database object associated with the query and its definition would be added to the ordered set. Similarly, upon examination of the data dictionary, the system would identify trigger 525 as a database object associated with the query because of its tie to Table X 520. Consequently, the trigger's definition would be added to the ordered set. In subsequent passes, the system searches for new database objects identified in the object definitions in the ordered set (block 705). If any are found (block 710), their object definitions are retrieved and added to the ordered set (block 715). This process repeats until no new objects are found.

For example, continuing with the structure illustrated in FIG. 5, the system would examine the object definitions present in the ordered set and would find table 540 and view 545 in the definition of View Y 530. Consequently, their definitions would be added to the ordered set. In the next pass, the system would find table 550 and view 555 in the definition of view 545 and their definitions would be added to the ordered set. In the next pass, the system would find table 560 in the definition of view 555 and its definition would be added to the ordered set. In the next pass, no new objects would be found and the process of recursively retrieving database object definitions (block 605 in FIG. 6) would be complete.

Figure 8:
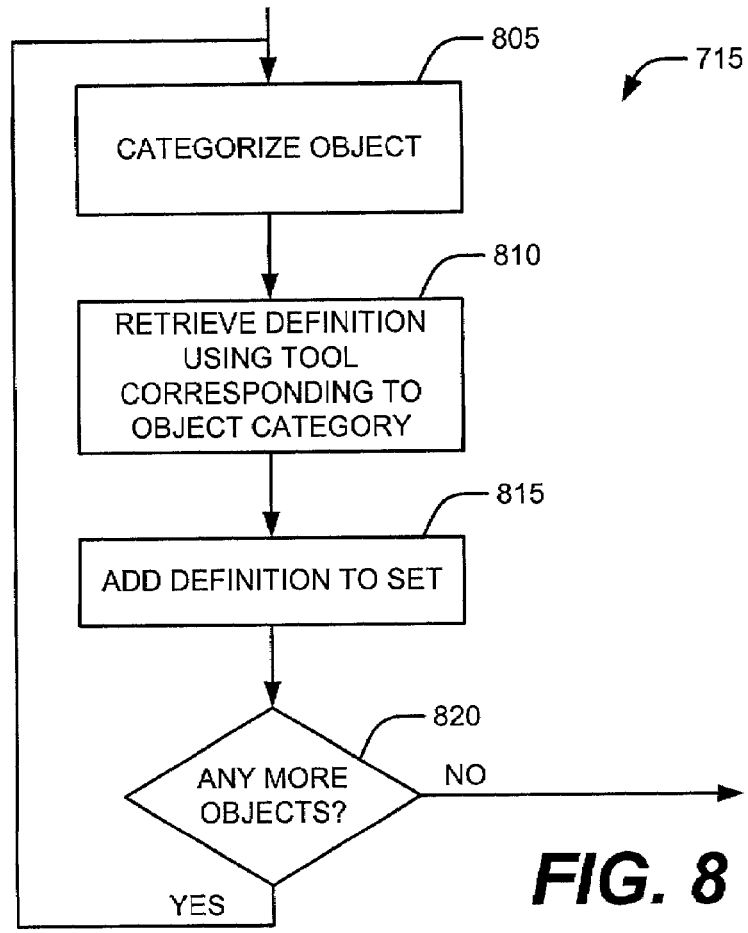
FIG. 8 is a flow chart of a method for obtaining object definitions.

An example of the process of retrieving unretrieved object definitions and adding them to the ordered set (block 715), illustrated in more detail in FIG. 8, begins by categorizing the object (block 805). In one example system, a database object can be a table, a view, a trigger, a macro or a join index. The system then retrieves the object definition for the database object using a tool corresponding to the object's category (block 810). The system then adds the object definition to the ordered set (block 815). The system repeats this process until no more objects are left (block 820).

Figure 9:
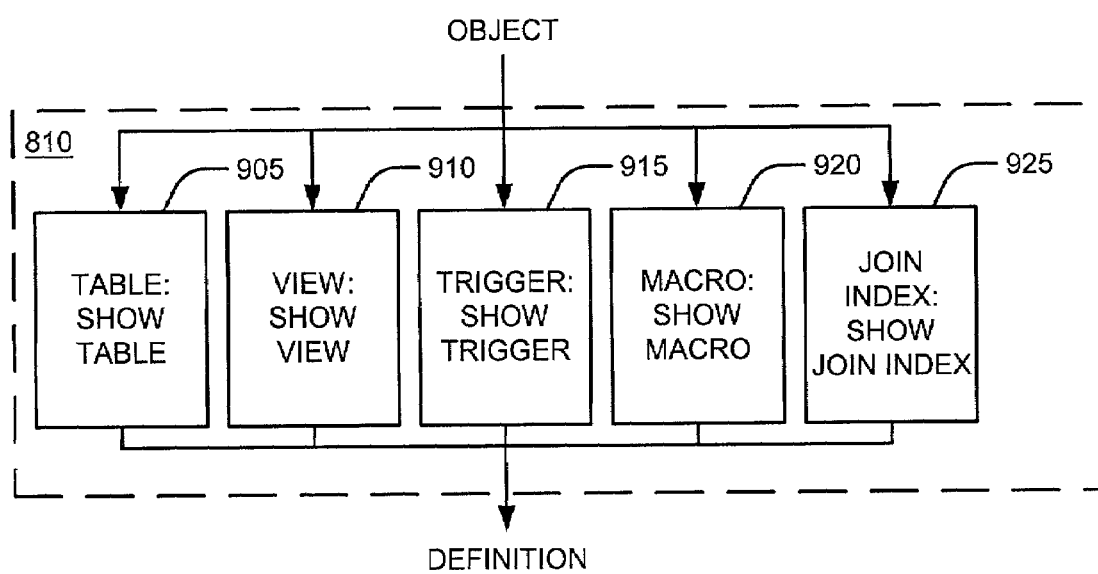
FIG. 9 is a flow chart of a method for retrieving object definitions.

Objects are categorized (block 805) so that the correct tool may be used to retrieve the object's definition (block 810). An example set of possible tools for various object categories (blocks 905–925), illustrated in FIG. 9, includes SHOW TABLE (block 905), SHOW VIEW (block 910), SHOW TRIGGER (block 915), SHOW MACRO (block 920), and SHOW JOIN INDEX (block 925).

Finally, the portion of the database structure may be rebuilt from the database's retrieved object definitions, and optionally, the statistical view of the data, and the configuration information concerning the system (block 625). The statistical view of the data and the configuration information are provided by other portions of the system not described herein. After the structure is rebuilt, it may be necessary to populate the database with data before running the query.

In addition to being useful for troubleshooting a failed query, this method may also be helpful to a database administrator who wishes, for example, to quickly retrieve multiple table definitions to analyze a particular query.

This method can also be implemented on massively parallel processing (MPP) systems, which allow for more complex database structures. In an MPP environment, retrieving a portion of the database structure for a query may involve hundreds of object definitions. Therefore, being able to easily retrieve this structure automatically is more critical than on simpler systems with simpler database structures.

While particular preferred embodiments of the present invention have been described, it is not intended that these details should be regarded as limitations on the present invention, except to the extent that they are included in the following claims.

We claim:

1. A computer implemented method for copying a portion of a database structure, the database including one or more database objects, the method comprising:
   recursively retrieving object definitions in the database for one or more database objects associated with a query to produce an ordered set of object definitions, wherein said recursively retrieving object definitions includes:
   a. retrieving unretrieved object definitions for a set of objects known to be associated with the query;
   b. adding to the set of object known to be associated with the query objects contained in the retrieved object definitions that are not already in the set of objects known to be associated with the query;
   c. repeating items a and b until no new objects are added to the set of objects known to be associated with the query; and
   building a copy of the database structure using the ordered set of object definitions.

2. The method of claim 1, where recursively retrieving object definitions includes
   recursively identifying objects associated with the query;
   categorizing each identified object into a category;
   retrieving an object definition for each identified object using a tool corresponding to the category with which the identified object is connected.

3. The method of claim 2, where the categories include tables, views, join indexes, triggers and macros.

4. The method of claim 2, where the tool is
   a. a SHOW VIEW statement if the identified object is categorized as a view;
   b. a SHOW TABLE statement if the identified object is categorized as a table;
   c. a SHOW JOIN INDEX statement if the identified object is categorized as a join index;
   d. a SHOW TRIGGER statement if the identified object is categorized as a trigger;
   e. a SHOW MACRO statement if the identified object is categorized as a macro.

5. The method of claim 1, further comprising sending the ordered set of object definitions from a first computer to a second computer.

6. The method of claim 1, further comprising changing the order of the ordered set of object definitions.

7. The method of claim 6, where changing the order of the ordered set of object definitions includes reordering the object definitions so that each object definition is ordered before the definition of any object that references it.

8. The method of claim 1, where the object definitions are ordered so that each object definition is ordered before the definition of any object that references it.

9. The method of claim 1, where recursively retrieving object definitions for one or more database objects includes looking for references to the one or more database objects in a data dictionary.

10. A computer-readable storage medium containing computer-readable code for instructing a computer to:
    recursively retrieve object definitions in a database for one or more database objects associated with a query to produce an ordered set of object definitions, wherein said recursively retrieve object definitions includes:
    a. retrieves unretrieved object definitions for a set of objects known to be associated with the query;
    b. adds to the set of object known to be associated with the query objects contained in the retrieved object definitions that are not already in the set of objects known to be associated with the query;

c. repeats items a and b until no new objects are added to the set of objects known to be associated with the query; and build a copy of a database structure using the ordered set of object definitions.

11. The computer-executable code of claim 10, in which, when recursively retrieving object definitions, the computer:
recursively identifies objects associated with the query;
categorizes each identified object into a category;
retrieves an object definition for each identified object using a tool corresponding to the category with which the identified object is connected.

12. The computer-executable code of claim 11, where the categories include tables, views, join indexes, triggers and macros.

13. The computer-executable code of claim 11, where the tool is
a. a SHOW VIEW statement if the identified object is categorized as a view;
b. a SHOW TABLE statement if the identified object is categorized as a table;
c. a SHOW JOIN INDEX statement if the identified object is categorized as a join index;
d. a SHOW TRIGGER statement if the identified object is categorized as a trigger;
e. a SHOW MACRO statement if the identified object is categorized as a macro.

14. The computer-executable code of claim 10, further comprising computer-executable code instructing the computer to send the object definitions from a first computer to a second computer.

15. The method of claim 10, further comprising computer-executable code instructing the computer to change the order of the ordered set of object definitions.

16. The computer-executable code of claim 15, in which, when changing the order of the ordered set of object definitions, the computer reorders the object definitions so that each object definition is ordered before the definition of any object that references it.

17. The computer-executable code of claim 10, in which, when storing the definitions, the computer stores the definitions so that each object definition is ordered before the definition of any object that references it.

18. The computer executable code of claim 10, in which, when recursively retrieving object definitions for one or more database objects, the computer looks for references to the one or more database objects in a data dictionary.

19. A package of data stored in a computer readable storage medium for building a copy of a database structure generated in accordance with the following act:
recursively retrieving object definitions in the database for one or more database objects associated with a query to produce an ordered set of object definitions, wherein said recursively retrieving object definitions includes:

a. retrieving unretrieved object definitions for a set of objects known to be associated with the query;
b. adding to the set of objects known to be associated with the query objects contained in the retrieved object definitions that are not already in the set of objects known to be associated with the query;
C. repeating items a and b until no new objects are added to the set of objects known to be associated with the query; and
building the package of data using the ordered set of object definitions.

20. The package of data of claim 19, where the object definitions are recursively retrieved in accordance with the following acts:
recursively identifying objects associated with the query;
categorizing each identified object into a category;
retrieving an object definition for each identified object using a tool corresponding to the category with which the identified object is connected.

21. The package of data of claim 20, where the categories include tables, views, join indexes, triggers and macros.

22. The package of data of claim 20, where the tool is
a. a SHOW VIEW statement if the identified object is categorized as a view;
b. a SHOW TABLE statement if the identified object is categorized as a table;
c. a SHOW JOIN INDEX statement if the identified object is categorized as a join index;
d. a SHOW TRIGGER statement if the identified object is categorized as a trigger;
e. a SHOW MACRO statement if the identified object is categorized as a macro.

23. The package of data of claim 19, further comprising the act of sending the ordered set of object definitions from a first computer to a second computer.

24. The package of data of claim 19, further comprising the act of instructing the computer to change the order of the ordered set of object definitions.

25. The package of data of claim 24, where the act of changing the order of the ordered set of object definitions includes reordering the object definitions so that each object is ordered before the definition of any object that references it.

26. The package of data of claim 19, where the act of storing object definitions includes storing the object definitions so that each object definition is ordered before the definition of any object that references it.

27. The package of data of claim 19, where the act of recursively retrieving object definitions for one or more database objects includes looking for references to the one or more database objects in a data dictionary.

* * * * *